US009828503B2

(12) United States Patent
Roth et al.

(10) Patent No.: US 9,828,503 B2
(45) Date of Patent: Nov. 28, 2017

(54) GLOW WIRE RESISTANT POLYAMIDES

(71) Applicant: BASF SE, Ludwigshafen (DE)

(72) Inventors: Michael Roth, Lautertal (DE); Klaus Uske, Bad Dürkheim (DE); Christoph Minges, Burrweiler (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/783,924

(22) PCT Filed: Apr. 7, 2014

(86) PCT No.: PCT/EP2014/056890
§ 371 (c)(1),
(2) Date: Oct. 12, 2015

(87) PCT Pub. No.: WO2014/170148
PCT Pub. Date: Oct. 23, 2014

(65) Prior Publication Data
US 2016/0053115 A1 Feb. 25, 2016

(30) Foreign Application Priority Data
Apr. 15, 2013 (EP) ..................................... 13163730

(51) Int. Cl.
*C08L 77/06* (2006.01)
*C08L 77/00* (2006.01)

(52) U.S. Cl.
CPC ............. *C08L 77/06* (2013.01); *C08L 77/00* (2013.01)

(58) Field of Classification Search
CPC .......... C08L 77/00; C08L 23/08; C08L 77/06; C08K 3/02; C08K 3/34; C08K 3/5313; C08K 2003/026
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton | |
| 3,393,210 A | 7/1968 | Speck | |
| 4,537,949 A | 8/1985 | Schmidt et al. | |
| 4,540,772 A | 9/1985 | Pipper et al. | |
| 5,049,599 A | 9/1991 | Steiert et al. | |
| 6,084,012 A | 7/2000 | Gareiss et al. | |
| 6,194,538 B1 | 2/2001 | Weiss et al. | |
| 6,547,992 B1* | 4/2003 | Schlosser ............ | C08K 5/5313 252/609 |
| 6,699,960 B1 | 3/2004 | Ohlbach et al. | |
| 2004/0006168 A1* | 1/2004 | Wagner ............... | C08K 3/0058 524/405 |
| 2006/0189747 A1 | 8/2006 | Joachimi et al. | |
| 2006/0235191 A1 | 10/2006 | Deininger et al. | |
| 2007/0093584 A1* | 4/2007 | Hoerold ............... | C08K 3/02 524/414 |
| 2007/0299171 A1* | 12/2007 | Couillens ........... | C08K 5/34922 524/133 |
| 2009/0012229 A1 | 1/2009 | Desbois et al. | |

FOREIGN PATENT DOCUMENTS

| | | |
|---|---|---|
| CA | 1284016 C | 5/1991 |
| DE | 19648503 A1 | 5/1998 |
| DE | 10313681 A1 | 10/2004 |
| EP | 38094 A2 | 10/1981 |
| EP | 38582 A2 | 10/1981 |
| EP | 39524 A1 | 11/1981 |
| EP | 129195 A2 | 12/1984 |
| EP | 129196 A2 | 12/1984 |
| EP | 176836 A2 | 4/1986 |
| EP | 299444 A2 | 1/1989 |
| EP | 384232 A1 | 8/1990 |
| EP | 922065 A2 | 6/1999 |
| EP | 1024167 A1 | 8/2000 |
| EP | 1198491 A1 | 4/2002 |
| EP | 1741754 A1 | 1/2007 |
| EP | 1994075 A2 | 11/2008 |
| WO | WO-2005121249 A1 | 12/2005 |

OTHER PUBLICATIONS

Finntalc M2OSLE Product Information, Nov. 19, 2014.*
Plastic Additives & Compound, pp. 46-49, May/Jun. 2004.*
U.S. Appl. No. 13/457,661, filed Apr. 27, 2012.
U.S. Appl. No. 13/481,402, filed May 25, 2012.
U.S. Appl. No. 13/617,570, filed Sep. 14, 2012.
U.S. Appl. No. 13/706,877, filed Dec. 6, 2012.

(Continued)

Primary Examiner — Christopher M Rodd
(74) Attorney, Agent, or Firm — Marshall, Gerstein & Borun LLP

(57) ABSTRACT

The invention relates to the use of thermal plastic molding compositions comprising

| | | |
|---|---|---|
| A) | from 10 | to 97% by weight of a thermoplastic polyamide, |
| B) | from 1 | to 10% by weight of red phosphorus, |
| C) | from 0.15 | to 6% by weight of a dialkylphosphinic salt, where the ratio of B) to C) is from 6:1 to 6:4, |
| D) | from 1 | to 10% by weight of an ethylene copolymer as impact modifier comprisingas component D) a copolymer of |
| $D_1$) | from 40 | to 98% by weight of ethylene |
| $D_2$) | from 2 | to 40% by weight of a (meth)acrylate having from 1 to 18 carbon atoms, or/and |
| $D_3$) | from 0 | to 20% by weight of functional monomers selected from the group of the ethylenically unsaturated mono- or dicarboxylic acids or of the carboxylic anhydrides or epoxide groups, or a mixture of these, or an ethylene-(meth)acrylic acid copolymer neutralized with zinc up to an extent of 72%, |
| E) | from 0 | to 5% by weight of talc powder with a median particle size ($d_{50}$ value) below 7.5 μm, |
| F) | from 0 | to 60% by weight of further additional substances, | where the sum of the percentages by weight of components A) to F) is 100%, for the production of flame-retardant, glow-wire-resistant moldings.

9 Claims, No Drawings

(56) References Cited

OTHER PUBLICATIONS

U.S. Appl. No. 13/769,979, filed Feb. 19, 2013.
U.S. Appl. No. 13/847,511, filed May 20, 2013.
U.S. Appl. No. 13/912,432, filed Jun. 7, 2013.
U.S. Appl. No. 13/920,281, filed Jun. 18, 2013.
U.S. Appl. No. 13/969,743, filed Aug. 19, 2013.
U.S. Appl. No. 14/029,999, filed Sep. 18, 2013.
U.S. Appl. No. 14/352,147, filed Apr. 16, 2014.
U.S. Appl. No. 14/357,445, filed May 9, 2014.
Schmitt, E. "Phosphorus-Based Flame Retardants for Thermoplastics," *Plastics, Additives and Compounding* (2007), vol. 9, No. 3, pp. 26-30.
International Search Report in International Patent Application No. PCT/EP2014/056890, dated Jun. 23, 2014.

* cited by examiner

GLOW WIRE RESISTANT POLYAMIDES

CROSS-REFERENCE TO RELATED APPLICATIONS

This is the U.S. National Stage of PCT/EP2014/056890, filed Apr. 7, 2014, which claims the benefit of European Patent Application No. 13163730.8, filed Apr. 15, 2013.

The invention relates to the use of thermal plastic molding compositions comprising

| A) | from 10 | to | 97% by weight of a thermoplastic polyamide |
| B) | from 1 | to | 10% by weight of red phosphorus, |
| C) | from 0.15 | to | 6% by weight of a dialkylphosphinic salt, where the ratio of B) to C) is from 6:1 to 6:4, |
| D) | from 1 | to | 10% by weight of an ethylene copolymer as impact modifier, comprising as component D) a copolymer of |
| $D_1$) | from 40 | to | 98% by weight of ethylene |
| $D_2$) | from 2 | to | 40% by weight of a (meth)acrylate having from 1 to 18 carbon atoms, or/and |
| $D_3$) | from 0 | to | 20% by weight of functional monomers selected from the group of the ethylenically unsaturated mono- or dicarboxylic acids or of the carboxylic anhydrides or epoxide groups, or a mixture of these, or | an ethylene-(meth)acrylic acid copolymer neutralized with zinc up to an extent of 72%,

| E) | from 0 | to | 5% by weight of talc powder with a median particle size ($d_{50}$ value) below 7.5 μm, |
| F) | from 0 | to | 60% by weight of further additional substances, | where the sum of the percentages by weight of components A) to F) is 100%, for the production of flame-retardant, glow-wire-resistant moldings.

Red phosphorus has been known for a long time as an extremely effective flame retardant specifically for glassfiber-reinforced polyamides and for many other plastics. However, many applications require that plastics compositions are not only provided with high flame retardancy: in high-specification applications in the electrical and electronics sector constantly increasing importance is placed on the fine-tuning of properties of materials to give a balanced product profile involving high flame retardancy values together with very good values for mechanical and electrical properties.

A decisive factor specifically in the case of thin-walled components which by way of example have highly stressed snap connections is that the materials used in particular have good tensile strain values while also having high toughness.

Glassfiber-reinforced compounded polyamide materials comprising halogen-free flame-retardancy systems generally have poorer mechanical properties than similar compositions without any flame-retardancy system, specifically in relation to tensile strain at break and impact resistance. However, addition of impact modifiers based on olefin (co)polymers often leads to severely impaired flame-retardancy properties.

When impact modifiers are added, the phosphinate: phosphorus ratios proposed according to the prior art (EP-A 174 17 54) do not give adequate flame retardancy, and in particular the materials then fail the glow-wire test based on DIN EN 60695-2-12.

It was therefore an object of the present invention to provide impact-modified polyamides which have a halogen-free flame-retardancy system and at the same time have good fire-protection properties, and in particular have glow-wire resistance. The use defined in the introduction has accordingly been found. Preferred embodiments can be found in the dependent claims.

The molding compositions that can be used in the invention comprise, as component A), from 10 to 97% by weight, preferably from 20 to 96% by weight, and in particular from 30 to 87% by weight, of at least one polyamide.

The polyamides of the molding compositions of the invention generally have an intrinsic viscosity of from 90 to 350 ml/g, preferably from 110 to 240 ml/g, determined in a 0.5% by weight solution in 96% by weight sulfuric acid at 25° C. to ISO 307.

Preference is given to semicrystalline or amorphous resins with a molecular weight (weight average) of at least 5000, described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having 6 to 12, in particular 6 to 10, carbon atoms, and aromatic dicarboxylic acids. Acids that may be mentioned here, merely as examples, are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, where the molar ratio of MXDA to adipic acid is 1:1), di(4-aminophenyl)methane, di(4-aminocyclohexyl)methane, 2,2-di(4-aminophenyl)propane, 2,2-di(4-aminocyclohexyl)propane, and 1,5-diamino-2-methylpentane.

Preferred polyamides are polyhexamethyleneadipamide, polyhexamethylenesebacamide, and polycaprolactam, and also nylon-6/6,6 copolyamides, in particular having a proportion of from 5 to 95% by weight of caprolactam units (e.g. Ultramid® C31 from BASF SE). Other suitable polyamides are obtainable from ω-aminoalkylnitriles, e.g. aminocapronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular nylon-6/6,6 copolyamides.

Other copolyamides which have proven particularly advantageous are semiaromatic copolyamides, such as PA 6/6T and PA 66/6T, where the triamine content of these is less than 0.5% by weight, preferably less than 0.3% by weight (see EP-A 299 444). Other polyamides resistant to high temperatures are known from EP-A 19 94 075 (PA 6T/6I/MXD6).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised:

AB polymers:
PA 4 Pyrrolidone
PA 6 ε-Caprolactam
PA 7 Ethanolactam
PA 8 Caprylolactam
PA 9 9-Aminopelargonic acid
PA 11 11-Aminoundecanoic acid
PA 12 Laurolactam AA/BB polymers:
PA 46 Tetramethylenediamine, adipic acid
PA 66 Hexamethylenediamine, adipic acid
PA 69 Hexamethylenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA 9T 1,9-Nonanediamine, terephthalic acid
PA MXD6 m-Xylylenediamine, adipic acid
PA 6I Hexamethylenediamine, isophthalic acid
PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 Diaminodicyclohexylmethane, laurolactam
PA 6I/6T/PACM as PA 6I/6T+diaminodicyclohexylmethane
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid The flame retardant B) of the invention is elemental red phosphorus, in particular in combination with glassfiber-reinforced molding compositions; it can be used in untreated form.

However, particularly suitable preparations are those in which the phosphorus has been surface-coated with low-molecular-weight liquid substances, such as silicone oil, paraffin oil, or esters of phthalic acid (in particular dioctyl phthalate, see EP 176 836) or adipic acid, or with polymeric or oligomeric compounds, e.g. with phenolic resins or amino plastics, or else with polyurethanes (see EP-A 384 232, DE-A 196 48 503). The amounts comprised of these "phlegmatizing agents" are generally from 0.05 to 5% by weight, based on 100% by weight of B).

Concentrates of red phosphorus, e.g. in a polyamide or elastomer, are moreover suitable as flame retardants. In particular, polyolefin homo- and copolymers are suitable as concentrate polymers.

Preferred concentrate compositions are
B$_1$) from 30 to 90% by weight, preferably from 45 to 70% by weight, of a polyamide A) or elastomer D), and
B$_2$) from 10 to 70% by weight, preferably from 30 to 55% by weight, of red phosphorus.

The polyamide used for the masterbatch can differ from A) or preferably can be the same as A), in order to avoid any incompatibility or melting point difference having an adverse effect on the molding composition.

The median particle size (d$_{50}$) of the phosphorus particles dispersed in the molding compositions is preferably in the range from 0.0001 to 0.5 mm; in particular from 0.001 to 0.2 mm.

The content of component B) in the molding compositions that can be used in the invention is from 1 to 10% by weight, preferably from 3 to 8% by weight, and in particular from 4 to 7% by weight, based on the entirety of components A) to F).

It is essential here that the ratio of component B) to C) is from 6:1 to 6:4, preferably from 6:1.5 to 6:2.5.

The molding compositions that can be used in the invention comprise, as component C), from 0.15 to 6% by weight, preferably from 0.5 to 5% by weight, and in particular from 1 to 3% by weight, of a dialkylphosphinic salt.

It is preferable that component C) is composed of

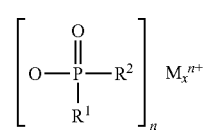

where R$^1$ and R$^2$ are mutually independently
methyl, ethyl, n-propyl, isopropyl, n-butyl, tert-butyl, n-pentyl, phenyl,
M=Mg, Ca, Al, Ti, Zn, Fe, Li, Na, K, or a protonated nitrogen base
x=from 1 to 4
n=from 1 to 4.

Particular preference is given to R$^1$ and R$^2$=methyl or ethyl and M=Al or Zn, and particular preference is given here to Al diethylphosphinate or Zn diethylphosphinate.

The phosphinates are preferably produced via precipitation of the corresponding metal salts from aqueous solutions. However, the phosphinates can also be precipitated in the presence of, as support material, a suitable inorganic metal oxide or metal sulfide (white pigments, for example TiO$_2$, SnO$_2$, ZnO, ZnS, SiO$_2$). The products are therefore surface-modified pigments. It is essential the B):C) ratio described above is from 6:1 to 6:4, preferably from 6:1.5 to 6:2.5.

It is moreover preferable that the C:E ratio (to the extent that talc powder is present) is from 1:1 to 2:0.002, preferably from 1:1 to 1:0.05.

The molding compositions that can be used in the invention comprise, as component D), from 1 to 10% by weight, preferably from 4 to 8% by weight, and in particular from 5 to 7% by weight, of an impact modifier based on ethylene copolymers, which are composed of:
D$_1$) from 40 to 98% by weight, preferably from 50 to 94.5% by weight, of ethylene
D$_2$) from 2 to 40% by weight, preferably from 5 to 40% by weight, of a (meth)acrylate having from 1 to 18 carbon atoms, or/and
D$_3$) from 0 to 20% by weight, preferably from 0.05 to 10% by weight, of functional monomers selected from the group of the ethylenically unsaturated mono- or dicarboxylic acids or of the carboxylic anhydrides or epoxide groups, or a mixture of these, where the sum of the percentages by weight D1) to D3) is 100%, or
an ethylene-(meth)acrylic acid copolymer neutralized with zinc up to an extent of 72%.

Particular preference is given to ethylene copolymers composed of:
D$_1$) from 50 to 69.9% by weight of ethylene
D$_2$, from 30 to 40% by weight of a (meth)acrylate having from 1 to 18 carbon atoms $D_3$) from 0.1 to 10% by weight of functional monomers according to claim 1, where the sum of the percentages by weight $D_1$) to $D_3$) is 100%.

The proportion of the functional groups $D_3$) is from 0.05 to 5% by weight, preferably from 0.2 to 4% by weight, and in particular from 0.3 to 3.5% by weight, based on 100% by weight of D).

Particularly preferred components $D_3$) are composed of an ethylenically unsaturated mono- or dicarboxylic acid or of a functional derivative of such an acid.

In principle, any of the primary, secondary, or tertiary $C_1$-$C_{18}$-alkyl esters of acrylic acid or methacrylic acid $D_2$ are suitable, but preference is given to esters having from 1 to 12 carbon atoms, in particular having from 2 to 10 carbon atoms.

Examples here are methyl, ethyl, propyl, n-butyl, isobutyl and tert-butyl, 2-ethylhexyl, octyl, and decyl acrylates, and the corresponding esters of methacrylic acid. Among these, particular preference is given to n-butyl acrylate and 2-ethylhexyl acrylate.

The olefin polymers can also comprise, in addition to the esters, acid-functional and/or latently acid-functional monomers of ethylenically unsaturated mono- or dicarboxylic acids, or monomers having epoxy groups.

Other examples of monomers $D_3$) that may be mentioned are acrylic acid, methacrylic acid, tertiary alkyl esters of said acids, in particular tert-butyl acrylate, and dicarboxylic acids, such as maleic acid and fumaric acid, and anhydrides of said acids, and also monoesters of these.

Latently acid-functional monomers are compounds which, under the conditions of polymerization or during incorporation of the olefin polymers into the molding compositions, form free acid groups. Examples that may be mentioned here are anhydrides of dicarboxylic acids having up to 20 carbon atoms, in particular maleic anhydride, and tertiary $C_1$-$C_{12}$-alkyl esters of the abovementioned acids, in particular tert-butyl acrylate and tert-butyl methacrylate.

The ethylene copolymers described above can be produced by processes known per se, preferably via random copolymerization at high pressure and elevated temperature.

The melt index of the ethylene copolymers is generally in the range from 1 to 80 g/10 min (measured at 190° C. with 2.16 kg load).

The molar mass of said ethylene copolymers is from 10 000 to 500 000 g/mol, preferably from 15 000 to 400 000 g/mol (Mn, determined by means of GPC in 1,2,4-trichlorobenzene with PS calibration).

Commercially available products preferably used are Fusabond A 560, Lucalen A 2910, Lucalen A 3110, Nucrel 3990, Nucrel 925.

The ethylene copolymers described above can be produced by processes known per se, preferably via random copolymerization at high pressure and elevated temperature. Appropriate processes are well known.

Other preferred elastomers are emulsion polymers, production of which is described by way of example by Blackley in the monograph "Emulsion Polymerization". The emulsifiers and catalysts that can be used are known per se.

Particular preference is given to copolymers which comprise no units $D_2$), but where the acid component $D_3$) has been neutralized with Zn. Preference is given here to ethylene-(meth)acrylic acid copolymers neutralized with zinc up to an extent of 72% (available commercially as Surlyn® 9520 from DuPont).

The molding compositions of the invention can comprise, as component E), from 0 to 5% by weight, preferably from 0.002 to 1.5% by weight, and in particular from 0.05 to 1.0% by weight, of talc powder, which is a hydrated magnesium silicate of composition $Mg_3[(OH)_2/Si_4O_{10}]$ or $3MgO.4SiO_2.H_2O$. These materials known as three-layer phyllosilicates belong to the triclinic, monoclinic, or rhombic crystal system, with lamellar habit. Other trace elements that can be present are Mn, Ti, Cr, Ni, Na, and K, and there can be some replacement of the OH group here by fluoride.

Component E) has a median particle size ($d_{50}$ value) below 7.5 µm, preferably below 3 µm. In particular, talc powder with particle size 100%<20 µm is used. The particle size distribution is usually determined via DIN 6616-1 sedimentation analysis, and is preferably:

| | |
|---|---|
| <20 µm | 100% by weight |
| <10 µm | 99% by weight |
| <5 µm | 85% by weight |
| <3 µm | 60% by weight |
| <2 µm | 43% by weight |

Products of this type are available commercially as Micro-Talc I.T. extra (Norwegian Talc Minerals).

It is preferable that the BET surface area of component E) is less than 13 m²/g in accordance with ISO 4652, with preference from 9 to 12.5 m²/g.

The molding compositions of the invention can comprise, as component F), up to 60% by weight, preferably up to 50% by weight, of further additional substances.

Fibrous or particulate fillers F) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, amounts used of these being from 1 to 50% by weight, in particular from 5 to 40% by weight, preferably from 10 to 40% by weight.

Preferred fibrous fillers that may be mentioned are carbon fibers, aramid fibers, and potassium titanate fibers, particular preference being given here to glass fibers in the form of E glass. These can be used in the form of rovings or chopped glass in the forms available commercially.

In order to improve compatibility with the thermoplastics, the fibrous fillers can have been surface-pretreated with a silane compound.

Suitable silane compounds are those of the general formula

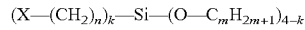

in which the definitions of the substituents are as follows:

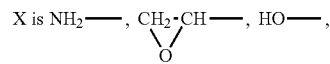

n is an integer from 2 to 10, preferably from 3 to 4
m is an integer from 1 to 5, preferably from 1 to 2
k is an integer from 1 to 3, preferably 1.

Preferred silane compounds are am inopropyltrimethoxysilane, am inobutyltrimethoxysilane, aminopropyltriethoxysilane, aminobutyltriethoxysilane, and also the corresponding silanes which comprise a glycidyl group as substituent X.

The amounts of the silane compounds generally used for surface treatment are from 0.01 to 2% by weight, preferably from 0.025 to 1.0% by weight, and in particular from 0.05 to 0.5% by weight (based on F).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if appropriate, have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions of the invention can comprise, as component F), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal, Zn and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component F), amounts of from 0.01 to 2% by weight, preferably from 0.1 to 1.5% by weight, of what are known as acid scavengers for the red phosphorus.

Suitable acid scavengers are ZnO, Zn borate, Zn stannate, MgO, $Mg(OH)_2$, $ZnCO_3$, $MgCO_3$, $CaCO_3$, Mg Ca carbonates, and AlOOH, particular preference being given here to ZnO, basic $ZnCO_3$, $Mg(OH)_2$, $CaCO_3$, and $CuO/ZnO/Al_2O_3$ mixed oxides $CaCO_3$, ZnO.

Suitable sterically hindered phenols F) are in principle all of the compounds which have a phenolic structure and which have at least one bulky group on the phenolic ring.

Examples of compounds that can be used with preference are those of the formula

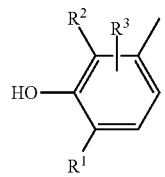

where:
$R^1$ and $R^2$ are an alkyl group, a substituted alkyl group, or a substituted triazole group, and where the radicals $R^1$ and $R^2$ may be identical or different, and $R^3$ is an alkyl group, a substituted alkyl group, an alkoxy group, or a substituted amino group.

Antioxidants of the abovementioned type are described by way of example in DE-A 27 02 661 U.S. Pat. No. 4,360,617).

Another group of preferred sterically hindered phenols is provided by those derived from substituted benzenecarboxylic acids, in particular from substituted benzenepropionic acids.

Particularly preferred compounds from this class are compounds of the formula

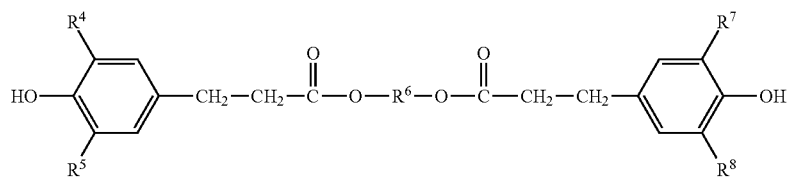

where $R^4$, $R^5$, $R^7$, and $R^8$, independently of one another, are $C_1$-$C_8$-alkyl groups which themselves may have substitution (at least one of these substituents being a bulky group), and $R^6$ is a divalent aliphatic radical which has from 1 to 10 carbon atoms and whose main chain may also have C—O bonds.

Preferred compounds corresponding to this formula are

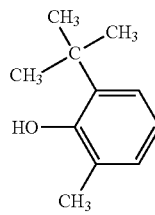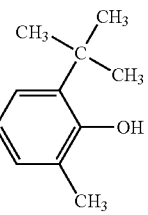

(Irganox® 245 from BASF SE)

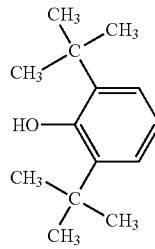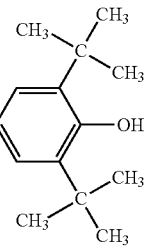

(Irganox® 259 from BASF SE)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenyl), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098), and the product Irganox® 245 described above from BASF SE, which has particularly good suitability.

In some instances, sterically hindered phenols having not more than one sterically hindered group in ortho-position with respect to the phenolic hydroxy group have proven particularly advantageous, in particular when assessing colorfastness on storage in diffuse light over prolonged periods.

The materials known as copper stabilizers provide another group of preferred antioxidants, in amounts of from 0.02 to 1% by weight, preferably from 0.05 to 0.5% by weight.

These copper stabilizers are generally composed of two components, namely of a mixture of copper compounds and of specific halide salts. The usual copper compounds are the copper(I) halides, and also copper salts such as copper acetate, copper sulfate, or copper stearate, and the copper complexes, for example copper acetylacetonate. In order that these compounds are effective as antioxidants, halogen compounds must be added in large excess. Those used here are in particular potassium iodide, and also potassium bromide. The amount used here is usually selected in such a way that the molar ratio copper:halogen is 1:from 5 to 15. The recommended amount added is generally from 30 to 200 ppm of copper. Preference is moreover given to copper complexes with the following complex ligands: triphenylphosphines, mercaptobenzimidazoles, acetylacetonates, and glycine. Particular preference is given to triphenylphosphines and mercaptobenzimidazoles.

Preferred copper complexes used are usually formed via reaction of copper(I) ions with the phosphine compounds or mercaptobenzimidazole compounds. By way of example, said complexes can be obtained via reaction of triphenylphosphine with a copper(I) halide suspended in chloroform (G. Kosta, E. Reisenhofer and L. Stafani, J. Inorg. Nucl. Chem. 27 (1965) 2581). However, it is also possible to carry out reductive reaction of copper(II) compounds with triphenylphosphine and thus obtain the copper(I) adducts (F. U. Jardine, L. Rule, A. G. Vohrei, J. Chem. Soc. (A) 238-241 (1970)).

Examples of suitable complexes can be represented by the following formulae:

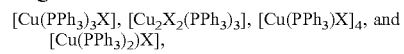

where X is selected from Cl, Br, I, CN, SCN, or 2-MBI.

The amount comprised of the antioxidants F), which can be used individually or in the form of mixtures, is from 0.05 up to 3% by weight, preferably from 0.01 to 1.5% by weight, in particular from 0.1 to 1% by weight, based on the total weight of the molding compositions A) to F).

The molding compositions of the invention can comprise, as component F), from 0.05 to 5% by weight, preferably from 0.1 to 2% by weight, and in particular from 0.25 to 1.5% by weight, of a nigrosin.

Nigrosins are generally a group of black or gray phenazine dyes (azine dyes) related to the indulines and taking various forms (water-soluble, liposoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosins are obtained industrially via heating of nitrobenzene, aniline, and aniline hydrochloride with metallic iron and FeCl₃ (the name being derived from the Latin niger=black).

Component F) can be used in the form of free base or else in the form of salt (e.g. hydrochloride).

Further details concerning nigrosins can be found by way of example in the electronic encyclopedia Römpp Online, Version 2.8, Thieme-Verlag Stuttgart, 2006, keyword "Nigrosin".

The thermoplastic molding compositions of the invention can comprise, as component F), conventional processing aids, such as stabilizers, oxidation retarders, agents to counteract decomposition due to heat and decomposition due to ultraviolet light, lubricants and mold-release agents, colorants, such as dyes and pigments, nucleating agents, plasticizers, etc.

Examples of oxidation retarders and heat stabilizers are sterically hindered phenols and/or phosphites, and amines (e.g. TAD), hydroquinones, aromatic secondary amines, such as diphenylamines, various substituted members of these groups, and mixtures of these, at concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc powder.

The thermoplastic molding compositions of the invention can be produced by processes known per se, by mixing the starting components in conventional mixing apparatus, such as screw-based extruders, Brabender mixers, or Banbury mixers, and then extruding the same. The extrudate can be cooled and pelletized. It is also possible to premix individual components and then to add the remaining starting materials individually and/or likewise in the form of a mixture. The mixing temperatures are generally from 230 to 320° C.

In another preferred method of operation, it is possible to mix components B), D), and C), and also optionally F) and E) with a prepolymer, and to compound and pelletize the material. The resultant pellets are then solid-phase condensed under inert gas continuously or batchwise at a temperature below the melting point of component A) until the desired viscosity is reached.

The thermoplastic molding compositions that can be used in the invention feature good flame retardancy and excellent phosphorus stability.

These materials are therefore suitable for the production of moldings which pass the GWFI (glow wire flammability index) test in accordance with DIN EN 60 695-2-12 at 960° C.

Some examples will now be mentioned: plug connectors, plugs, plug parts, cable harness components, circuit mounts, circuit-mount components, three-dimensionally injection-molded circuit mounts, electrical connectors, and mechatronic components.

The moldings or semifinished products to be produced from the thermoplastic molding compositions in the invention can be used by way of example in the motor vehicle industry, electrical industry, electronics industry, telecommunications industry, information technology industry, consumer electronics industry, or computer industry, in vehicles and other means of conveyance, in ships, in spacecraft, in the household, in office equipment, in sports, in medicine, and also generally in articles and parts of buildings which require increased fire protection.

Possible uses of improved-flow polyamides in the kitchen and household sector are for the production of components for kitchen devices, e.g. fryers, smoothing irons, knobs, and also applications in the garden and leisure sector.

EXAMPLES

The following components were used:

Component A:

Nylon-6,6 with an intrinsic viscosity IV of 150 ml/g, measured on a 0.5% by weight solution in 96% by weight sulfuric acid at 25° C. in accordance with ISO 307 (the material used being Ultramid® A27 from BASF SE).

Component B/1:

50% concentrate of red phosphorus of median particle size ($d_{50}$) from 10 to 30 µm in nylon-6.

Component B/2:

Red phosphorus of median particle size ($d_{50}$) from 20 to 25 µm.

Component C/1:

Aluminum diethylphosphinate (Exolit® OP1230 Clariant Produkte GmbH).

Component C/2:

Zinc diethylphosphinate (Exolit® OP950 Clariant Produkte GmbH).

Component C/3:

Calcium hypophosphite (Sigma-Aldrich Co.) (comparison)

Component C/4 (for comparison)

Melamine polyphosphate (Melapur® 200/70 BASF SE)

Component D/1:

An olefin polymer of: 59.8% by weight of ethylene, 35% by weight of n-butyl acrylate, 4.5% by weight of acrylic acid, and 0.7% by weight of maleic anhydride with a melt index MFI (190/2.16) of 10 g/10 min. The copolymer was produced via copolymerization of the monomers at elevated temperature and elevated pressure.

Component D/2:

Ethylene-1-octene-maleic anhydride copolymer (Fusabond® 598D ex E.I. DuPont de Nemours and Company) (comparison).

Component E/1:

Talc powder with a median particle size $D_{50}$ of 2.3 µm and with a specific BET surface area of 9.5 $m^2/g$ (measured in accordance with ISO 4652) (Finntalc M05N ex Mondo Minerals B.V.).

Component E/2:

Talc powder with a median particle size $D_{50}$ of 1.7 µm and with a specific BET surface area of 12 $m^2/g$ (measured in accordance with ISO 4652) (Microtalc IT EXTRA ex Mondo Minerals B.V.).

Component E/3: Talc powder with a median particle size $D_{50}$ of 7.4 µm and with a specific BET surface area of 4.0 $m^2/g$ (measured in accordance with ISO 787/11) (Tital 4591ex Ankerpoort N.V.).

Component F/1:

30% concentrate of a gas black with a specific BET surface area of 180 $m^2/g$ (measured in accordance with DIN 66131) in nylon-6.

Component F/2:

40% concentrate of nigrosin in nylon-6.

Component F/3:

ZnO:Ca stearate:Irganox® 1098 (2:1:1)

Component F/4:

Standard chopped glass fiber for polyamides, length=4.5 mm, diameter=10 μm.

Production of the Molding Compositions

In order to demonstrate the improvements in phosphorus stability described in the invention, appropriate plastics molding compositions were prepared via compounding. To this end, the individual components were mixed in a ZSK 26 (Berstorff) twin-screw extruder with a throughput of 20 kg/h and at about 270° C. with a flat temperature profile, discharged in the form of strand, cooled until pelletizable, and pelletized.

Tests

The test specimens for the tests listed in table 1 were injection-molded in an Arburg 420C injection-molding machine at a melt temperature of about 270° C. and at a mold temperature of about 80° C.

The test specimens for the stress tests were produced in accordance with ISO 527-2:/1993, and the test specimens for the impact resistance tests were produced in accordance with ISO 179-2/1 eA.

The MVR tests were carried out in accordance with ISO 1133.

The flame retardancy of the molding compositions was determined firstly by the UL 94 V method (Underwriters Laboratories Inc. Standard of Safety, "Test for Flammability of Plastic Materials for Parts in Devices and Appliances", p. 14 to p. 18, Northbrook 1998).

Glow-wire resistance GWFI (glow-wire flammability index) was tested in accordance with DIN EN 60695-2-12 on plaques. The GWFI test is a general suitability test for plastics in contact with parts that carry an electrical potential. The temperature determined is the highest at which one of the following conditions is met in three successive tests: (a) no ignition of the specimen or (b) afterflame time or afterglow time 30 s after end of exposure to the glow wire, and no ignition of the underlay.

TABLE

| Components [% by wt.] | comp1 | comp2 | comp3 | comp4 | comp5 | comp6 |
|---|---|---|---|---|---|---|
| A | 46 | 54 | 41 | 46.1 | 51.5 | 46.6 |
| B/1 | 6.6 | 6.6 | 6.6 | 6.6 | 6.6 | 12 |
| B/2 | — | — | — | — | — | — |
| F/4 | 26 | 26 | 26 | 26 | 26 | 26 |
| C/1 | 10 | 2 | 10 | 6.6 | 3 | — |
| C/2 | — | — | — | — | — | — |
| C/3 | — | — | — | — | — | 4 |
| C/4 | — | — | 5 | 3.3 | 1.5 | — |
| D/1 | — | — | — | — | — | 10 |
| D/2 | 10 | 10 | 10 | 10 | 10 | — |
| E/1 | — | — | — | — | — | — |
| E/2 | — | — | — | — | — | — |
| E/3 | — | — | — | — | — | — |
| F/1 | — | — | — | — | — | — |
| F/2 | — | — | — | — | — | — |
| F/3 | 1.4 | 1.4 | 1.4 | 1.4 | 1.4 | 1.4 |
| Modulus of elasticity/[MPa] | 7089 | 7267 | 7097 | 7058 | 7047 | NOT EXTRUDABLE |
| Tensile stress at break/[MPa] | 93 | 108 | 99 | 97 | 107 | |
| Tensile strain at break/[%] | 4.3 | 3.9 | 3.8 | 3.5 | 3.3 | |
| Charpy impact resistance/[kJ/m$^2$] | 68 | 70 | 61 | 66 | 68 | |
| MVR 275° C./5 kg/[cm$^3$/10 min] | 20 | 32 | 8 | 14 | 20 | |
| UL 94 (1.6 mm) | n.c. | n.c. | V-0 | V-0 | V.0 | — |
| UL 94 (0.8 mm) | V-1 | n.c. | V-0 | V-1 | n.c. | — |
| Prot:C/1 ratio | 6:18 | 6:3.6 | 6:18 | 6:12 | 6:5.5 | — |
| GWFI 960 (1.5 mm) | Failed | Failed | Passed | Passed | Passed | — |

| Components [% by wt.] | 1 | 2 | 3 | 4 | 5 | 6 | 7 | 8 | 9 | 10 | 11 |
|---|---|---|---|---|---|---|---|---|---|---|---|
| A | 46.6 | 46.6 | 46.6 | 58.6 | 48.6 | 48.55 | 50.6 | 47.27 | 53.27 | 50.6 | 50.6 |
| B/1 | 12 | 12 | 12 | — | 12 | 12 | 12 | 12 | 12 | 12 | 12 |
| B/2 | — | — | — | 6 | — | — | — | — | — | — | — |
| F/4 | 26 | 26 | 26 | 26 | 26 | 26 | 26 | 26 | 26 | 26 | 26 |
| C/1 | — | 4 | 2 | 2 | 2 | 2 | 2 | 2 | 1 | 2 | 2 |
| C/2 | 4 | — | — | — | — | — | — | — | — | — | — |
| C/3 | — | — | — | — | — | — | — | — | — | — | — |
| D/1 | 10 | 10 | 10 | 6 | 10 | 10 | 6 | 6 | — | 6 | 6 |
| E/1 | — | — | 2 | — | 0.002 | 0.05 | 2 | 2 | 1 | — | — |
| E/2 | — | — | — | — | — | — | — | — | — | 2 | — |
| E/3 | — | — | — | — | — | — | — | — | — | — | 2 |
| F/1 | — | — | — | — | — | — | — | 3.33 | 3.33 | — | — |
| F/2 | — | — | — | — | — | — | — | — | 2.0 | — | — |
| F/3 | 1.4 | 1.4 | 1.4 | 1.4 | 1.4 | 1.4 | 1.4 | 1.4 | 1.4 | 1.4 | 1.4 |
| Modulus of elasticity/[MPa] | 8337 | 7393 | 7871 | 8137 | 7299 | 7239 | 8563 | 8377 | 8377 | 8344 | 8302 |
| Tensile stress at break/[MPa] | 121 | 112 | 118 | 138 | 118 | 121 | 132 | 128 | 132 | 129 | 129 |
| Tensile strain at break/[%] | 3.6 | 4.7 | 4.1 | 3.8 | 3.5 | 3.7 | 3.2 | 3.4 | 3.0 | 3.3 | 3.4 |
| Charpy impact resistance/[kJ/m$^2$] | 84 | 75 | 77 | 71 | 72 | 71 | 69 | 72 | 66 | 70 | 68 |

| | | | | | | | | | | | |
|---|---|---|---|---|---|---|---|---|---|---|---|
| MVR 275° C./5 kg/[cm³/10 min] | — | 13 | 12 | 40 | — | — | 29 | 21 | 24 | 28 | 26 |
| UL 94 (1.6 mm) | V-0 | V-0 | V-0 | V-0 | V-0 | V-0 | V-0 | V-0 | V-0 | V-0 | V-0 |
| UL 94 (0.8 mm) | — | V-0 | V-0 | V-0 | — | — | V-0 | V-0 | V-0 | V-0 | V-0 |
| Prot:C/1 resp. C/2 ratio | 6:4 | 6:4 | 6:2 | 6:2 | 6:2 | 6:2 | 6:2 | 6:2 | 6:1 | 6:2 | 6:2 |
| GWFI 960 (1.5 mm) | Passed | Passed | Passed | Passed | Passed | Passed | Passed | Passed | Passed | Passed | Passed |

The invention claimed is:

1. Use of a thermoplastic molding composition, the use comprising providing a molding composition comprising
    A) from 10 to 97% by weight of a thermoplastic polyamide,
    B) from 1 to 10% by weight of red phosphorus,
    C) from 0.15 to 6% by weight of a dialkylphosphinic salt, where the ratio of B) to C) is from 6:1 to 6:4,
    D) from 1 to 10% by weight of an ethylene copolymer as impact modifier, comprising as component D) a copolymer of
        $D_1$) from 40 to 98% by weight of ethylene
        $D_2$) from 2 to 40% by weight of a (meth)acrylate having from 1 to 18 carbon atoms, or/and
        $D_3$) from 0 to 20% by weight of functional monomers selected from the group of the ethylenically unsaturated mono- or dicarboxylic acids
            or of the carboxylic anhydrides or epoxide groups, or a mixture of these, or
        an ethylene-(meth)acrylic acid copolymer neutralized with zinc up to an extent of 72%,
    E) from 0 to 5% by weight of talc powder with a median particle size ($d_{50}$ value) below 7.5 µm,
    F) from 0 to 60% by weight of further additional substances selected from the group consisting of fibrous fillers, particulate fillers, lubricants, acid scavengers, antioxidants, nigrosins, oxidation retarders, heat stabilizers, ultraviolet stabilizers, mold-release agents, colorants, nucleating agents, and combinations thereof,
    where the sum of the percentages by weight of components A) to F) is 100% and the molding composition is free from zinc borate,
    in a production of flame-retardant, glow-wire-resistant moldings.

2. The use according to claim 1, where the molding compositions comprise
    A) from 10 to 97% by weight
    B) from 1 to 10% by weight
    C) from 0.15 to 6% by weight
    D) from 1 to 10% by weight
    E) from 0.0015 to 5% by weight
    F) from 0 to 60% by weight.

3. The use according to claim 1, where component C comprises

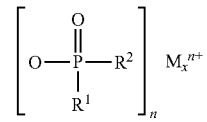

where $R^1$ and $R^2$ are mutually independently
    methyl, ethyl, n-propyl, isopropyl, n-butyl, tert-butyl, n-pentyl,
    M=Mg, Ca, Al, Ti, Zn, Fe, Li, Na, K, or a protonated nitrogen base
    x=from 1 to 4
    n=from 1 to 4.

4. The use according to claim 1, where component C) comprises zinc diethylphosphinate and/or Al diethylphosphinate.

5. The use according to claim 1, where the ratio of C) to E) is from 1:1 to 2:0.002.

6. The use according to claim 1, comprising as component D a copolymer of
    $D_1$) from 50 to 69.9% by weight of ethylene
    $D_2$) from 30 to 40% by weight of a (meth)acrylate having from 1 to 18 carbon atoms
    $D_3$) from 0.1 to 10% by weight of functional monomers according to claim 1,
    where the sum of the percentages by weight $D_1$) to $D_3$) is 100%.

7. The use according to claim 1, in which component $D_3$) comprises acrylic acid, maleic anhydride, glycidyl (meth)acrylate, or a mixture thereof.

8. The use according to claim 1, wherein a BET surface area in accordance with ISO 4652 of component E) is less than 13 m²/g.

9. A molding obtained according to the use of claim 1, which passes the GWFI (glow-wire flammability index) test in accordance with DIN EN 60 695-2-12 at 960° C.

* * * * *